United States Patent [19]

Hidaka

[11] Patent Number: 5,659,890
[45] Date of Patent: Aug. 19, 1997

[54] PORTABLE RADIO APPARATUS EQUIPPED WITH FUNCTION TO DISPLAY RECEIVED MESSAGE INFORMATION

[75] Inventor: Shinji Hidaka, Ome, Japan

[73] Assignee: Casio Computer Co., Ltd., Tokyo, Japan

[21] Appl. No.: 411,860

[22] Filed: Mar. 28, 1995

Related U.S. Application Data

[63] Continuation of Ser. No. 919,586, Jul. 22, 1992.

[30] Foreign Application Priority Data

Jul. 25, 1991 [JP] Japan ................................. 3-185986
Jul. 25, 1991 [JP] Japan ................................. 3-185988

[51] Int. Cl.$^6$ ............................................... H04B 1/38
[52] U.S. Cl. ................... 455/575; 455/90; 455/344; 455/351; 455/38.4; 455/556; 364/705.01
[58] Field of Search .................... 455/66, 89, 90, 455/344, 351, 186.1; 340/825.44, 825.26, 825.27; 379/357; 364/705.01, 705.02, 705.05; 395/235, 236, 237

[56] References Cited

U.S. PATENT DOCUMENTS

| | | | |
|---|---|---|---|
| 4,959,644 | 9/1990 | Sato | 340/825.44 |
| 4,972,457 | 11/1990 | O'Sullivan | 379/59 |
| 5,043,721 | 8/1991 | May | 340/825.44 |
| 5,049,874 | 9/1991 | Ishida et al. | 340/825.44 |
| 5,073,767 | 12/1991 | Holmes et al. | 340/311.1 |
| 5,163,161 | 11/1992 | Bowles et al. | 455/164.1 |
| 5,221,838 | 6/1993 | Gutman et al. | 340/825.44 |
| 5,252,964 | 10/1993 | Tan et al. | 340/825.48 |
| 5,257,307 | 10/1993 | Ise | 340/825.44 |
| 5,281,962 | 1/1994 | Vanden Heuvel et al. | 340/825.44 |
| 5,335,276 | 8/1994 | Thompson et al. | 455/89 |
| 5,430,436 | 7/1995 | Fennell | 340/825.44 |

FOREIGN PATENT DOCUMENTS

| | | |
|---|---|---|
| 64-8492 | 1/1989 | Japan . |
| 6-90309 | 3/1994 | Japan . |
| 2216319 | 10/1989 | United Kingdom . |
| 2256113 | 11/1992 | United Kingdom . |

*Primary Examiner*—Reinhard J. Eisenzopf
*Assistant Examiner*—Gertrude Arthur
*Attorney, Agent, or Firm*—Frishauf, Holtz, Goodman, Langer & Chick

[57] ABSTRACT

A portable radio apparatus comprises: a receiving unit for receiving message information transmitted by a radio wave; input/output terminals for transmitting/receiving information between the portable radio apparatus and an external device equipped with a data processing function; a storage unit for storing both of message information received by the receiving unit and the information inputted via the input/output terminals; a reading unit for selectively reading the information stored in the storage unit; and a display unit for displaying the information read from the reading unit. The apparatus fetches reception message information or the like stored in the storage unit via the input/output terminals so as to perform various processes such as display, correction and arrangement of the message information, and also other processes to store in the storage unit, information about telephone directory data and schedule data useful for the portable radio apparatus.

33 Claims, 14 Drawing Sheets

5,659,890

PORTABLE RADIO APPARATUS EQUIPPED WITH FUNCTION TO DISPLAY RECEIVED MESSAGE INFORMATION

This application is a continuation of application Ser. No. 07/919,586, filed Jul. 22, 1992.

BACKGROUND OF THE INVENTION

1. Field of the Invention

The present invention relates to a portable radio apparatus for receiving and displaying message information transmitted by a wireless system, and also to an information processing system used for this portable radio apparatus.

2. Description of the Related Art

As a portable radio apparatus equipped with such a function to receive and display message information in a wireless system, a paging receiver, a radio (wireless) data terminal and the like equipped with a so-called "selective paging receiving function" have been known which receive the above-described message information only when selective paging information transmitted prior to the message information is given to the owner apparatus.

There are two typical requirements for the current portable radio apparatuses such as paging receivers. As the first requirement, the portabilities must be improved by making the radio apparatus compact, slim and light in weight. For instance, pen type paging receivers, card type paging receivers and watch type paging receivers are commercially available. As the second requirement, the radio apparatus must be multi-functional. For example, in the commercially available paging receiver, a plurality of message information such as "URGENTLY CALL BACK TO FIRM" have been stored in this paging receiver, and a stereotyped message information display function is provided with this paging receiver, so that upon receipt of a predetermined code signal as the message information, the message information corresponding to this code signal is reproduced and displayed. Also, a plurality of data such as names and telephone numbers have been stored in the commercially available paging receiver, and the data are displayed upon request, namely the telephone directory function. Furthermore, there is another type of paging receiver having such a function capable of receiving and representing information such as stock prices and gold prices which are supplied from an information supplier by utilizing the radio message paging system.

In such radio multifunctional apparatuses, it is preferable that either the stereotyped message data, or the telephone directory data may be simply registered into a built-in type memory; a single message line of the received message data may be entirely displayed within one display time; and a plurality of reception messages may be subdivided in accordance with the sort of messages so as to be stored or edited and also be effectively and readily displayed.

However, to satisfy such conventional requirements, both a keyboard capable of easily inputting the numeral data and the character data as the data input means, and a large-screen-sized display device must be employed, so that the above-described first requirement, namely compactness, slim and light weight cannot be satisfied.

As one conventional method for entirely displaying all of the message information received by the portable radio apparatus, it has been proposed that the portable radio apparatus is coupled to another electronic device having a large-screen-sized display device, and the message information is displayed on this display device. For instance, Japanese Laid-open (KOKAI) Patent Application No. 64-8492 (opened on Jan. 12, 1989) discloses that the radio paging receiver having only a function to store received data and no display device is made as the same size as the IC card, this radio paging receiver is loaded on the IC card loading unit of the wordprocessor, instead of the IC card, and then the reception information stored in the memory employed in the radio paging receiver is displayed on the display device of the wordprocessor by way of the key operation effected at the wordprocessor.

Moreover, in this conventional paging system, the radio paging receiver is capable of only storing the received data, and has no means for announcing the contents of the received data to the operator, e.g., no display device and an audio speaker. As a consequence, upon receipt of the message information, not only the radio paging receiver but also the wordprocessor must be always carried by the operator who wishes to immediately confirm the contents of the received message information.

SUMMARY OF THE INVENTION

The present invention has been made in an attempt to solve the above-described problems, and therefore has an object to provide a portable radio receiving apparatus capable of displaying not only received information, but also other information.

Another object of the present invention is to provide such an information processing system that the above-described other information can be simply stored in the portable radio receiving apparatus, and also the information received by the portable radio receiving apparatus can be displayed on either this radio receiving apparatus, or another information processing apparatus at a high efficiency.

To achieve the above-described objects and other features of the present invention, an information processing system according to the present invention is equipped with an information processing apparatus and is useful for a portable radio receiving apparatus. This information processing apparatus comprises:

key input means having a plurality of data input keys and a plurality of control keys;

information storage means for storing information;

display means for displaying the information;

first input/output terminals for transmitting/receiving the information between the information process apparatus and an external device; and, control means for controlling the storage of the information into said information storage means, the display of the information on said display means, and the transmission/reception of the information via said first input/output terminals based upon control information inputted from said input means.

The radio apparatus comprises:

reception means for receiving message information transmitted by a radio wave;

second input/output means for transmitting/receiving the information between said radio apparatus and the external device;

storage means for storing both of the message information received by said reception means and the information inputted via said first input/output terminals;

reading means for selectively reading the information stored in said storage means; and display means for displaying the information read out by said reading means, The above-described information stored in the storage means of said radio apparatus is processed via the control means of said information processing apparatus by connecting said second input/output terminals of said radio apparatus with said first input/output terminals of said information processing apparatus thereby to operate said control keys of the information process apparatus.

BRIEF DESCRIPTION OF THE DRAWINGS

For a better understanding of the present invention, reference is made of the following detailed description in conjunction with the accompanying drawings, in which.

DETAILED DESCRIPTION OF THE PREFERRED EMBODIMENTS

Construction of First Information Process System

Referring now to FIGS. 1 to 10, a description will be described a construction of a first information process (processing) system according to a first preferred embodiment of the present invention. As seen from FIG. 1, a radio (telecommunication) unit and a storage medium are separately, or independently connected to an information process apparatus. The storage medium stores an application program used to process information such as reception information stored in the radio unit.

Figure 1:
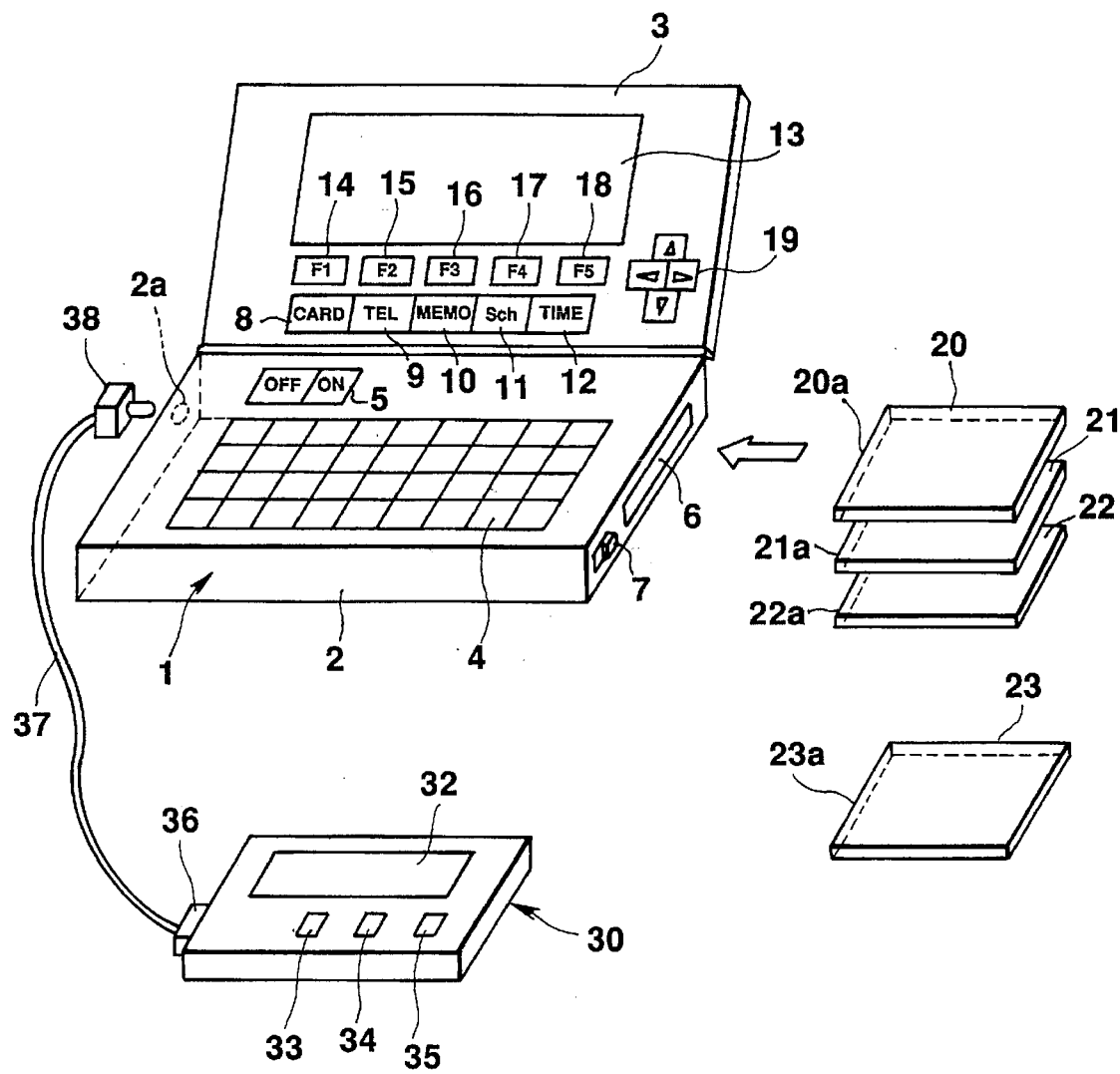
FIG. 1 is a perspective view of a first system arrangement of an information processing system according to the present invention.

FIG. 1 is a perspective view of this constructive example of the information process system. In this construction, reference numeral 1 indicates a main body of the information process apparatus which is so-called as "an electronic notebook". The electronic notebook owns various functions, for instance, a timer function for displaying present time, a schedule function for automatically displaying a schedule previously set at preselected time; and a telephone directory function to store data about a large quantity of personal names, personal addresses and personal telephone numbers and selectively display these data, if required. The main body 1 is constructed of a base body 2 and a lid body 3 freely opened/closed from/on the base body 2.

On the upper surface of the base body 2, there are provided a keyboard 4 and a power ON/OFF key 5 constructed of a large quantity of character/numeral keys and function keys. A plug jack 2a is provided on one side surface, to which a plug 38 is inserted. On the other side surface of the base body 2, there are provided a card loading unit 6 and a slide type lock key 7. An external storage medium for storing therein an application program used to an extension function, for example, an IC (integrated circuit) card 20 (will be discussed later), is inserted and loaded in the card loading unit 6. The lock key 7 mechanically locks this IC card in order not to elect the IC card from the card loading unit 6.

On an inside surface of the lid body 3, there are arranged along one line, a card key 8 for setting a card mode (will be described); a TEL key 9 for setting the mode of the above-described telephone directory function; a memo key 10 for setting a memo function mode in which data are freely inputted so as to be stored or read and be displayed; and a timer key 12 for setting the mode of the timer, function to represent a present time; and also a "Sch" key 11 for setting the mode of the schedule function. Also, a large-screen-sized liquid crystal display unit 13 of a dot matrix system is provided above these keys 8 to 12.

In addition, an F1 key 14, an F2 key 15, an F3 key 6, an F4 key 17, and an F5 key 18 are employed between the keys 8 to 12 and the liquid crystal display unit 13. Functions of these keys will be described later. Reference numeral 19 denote a cursor move key used to move a cursor on the liquid crystal display unit 13. Reference numerals 20, 21, 22 and 23 show IC cards. These IC cards store therein application programs and relevant data. The application programs are used to execute specific functions other than the above-described timer function, schedule function, memo, function, and telephone directory function which can be solely utilized by the main body 1 of the information process apparatus. Accordingly, when, for instance, the IC card 20 is loaded on the card loading unit 6, the translation function between Japanese and English is available. When the IC card 21 is loaded on the card loading unit 6, the proverb function is available. Also when the IC card 22 is loaded on the card loading unit 6, cooking data representation function is available, so that the function of the information process apparatus can be extended. On the other hand, when the IC card 23 is loaded on the card loading unit 6, such a function to process information stored in a selective paging receiver apparatus 30 (will be explained later).

A male connector (not shown in detail) having along number of connector pins is employed in the respective IC cards 20, 21, 22 and 23, and these connector pins are provided on each of insertion surfaces 20a, 21a, 22a and 23a to the card loading unit 6. A female connector is employed inside the card loading unit 6 of the main body 1, which is electrically connected to the above-described male connector when the IC cards 20, 21, 22 and 23 are completely inserted into the IC card loading unit 6.

In FIG. 1, reference numerals 30 indicates a radio (telecommunication) unit equipped with a selective paging reception function, capable of receiving a message signal, i.e., typically a radio paging receiver. On an upper surface of this selective paging receiver apparatus 30, there are provided a dot matrix type display apparatus 32 and key switches 33, 34 and 35. A wiring line 37 is mounted via a detachable electrical connecting member 36 on a side surface of this selective paging receiver unit 30. Another plug 38 insertable into the above-explained jack 2a is mounted on a tip portion of this wiring line 37.

Overall Circuit Arrangement of First Information Process Apparatus

Figure 2:
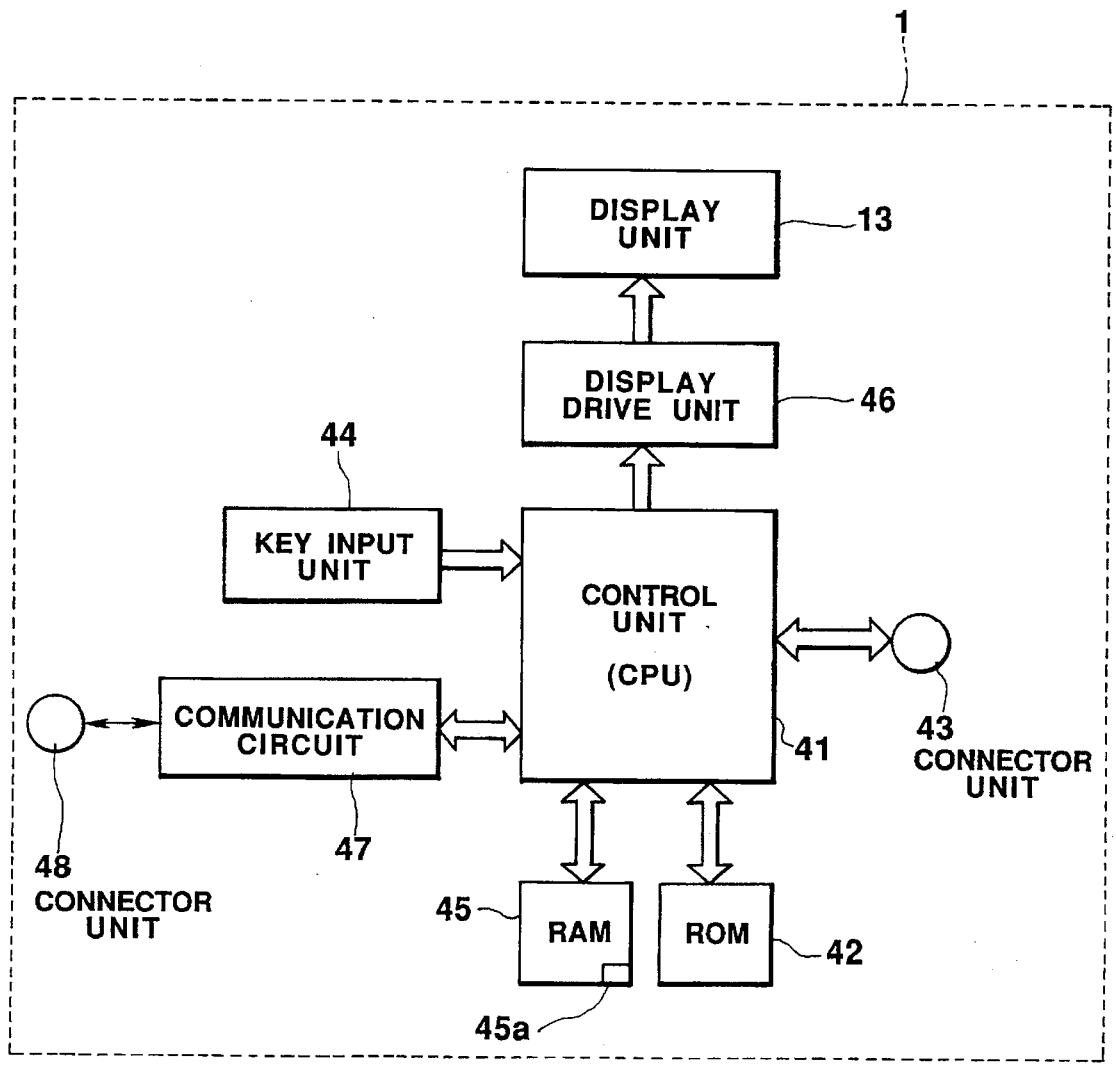
FIG. 2 is a schematic block diagram of a main body 1 of the information processing system shown in FIG. 1.

FIG. 2 schematically represents an overall circuit arrangement within the main body 1 of the first information process apparatus. In FIG. 2, reference numeral 41 indicates a control unit constructed of a microprocessor and a CPU (central processing unit) and the like. To this control unit 41, a ROM (read-only memory) 42, a connector unit 43, a key input unit 44, a RAM (random access memory) 45, a communication circuit 47 connected to the connector unit 48 (the jack 2a), and also a display drive unit 46 connected to the liquid crystal display unit 13.

The ROM 42 previously stores a microprogram to control the functions of the main body 1 of the first information process apparatus (simply referred to a "program"); a program to execute the extendible function application program stored in the IC card; numeral value/character data; and also display character data. The connector unit 43 disposed within the card loading unit 6, owns such a function that the extended function application programs derived from the IC cards 20, 21, 22 and 23, and the various sorts of data are supplied to the control unit 41, and also the various command signals, address signals, source voltage signals, control clock signals and the like supplied from the control unit 41 are supplied to the IC cards.

The key input unit 44 contains all keys other than the lock key 7 employed in the main body 1. The RAM 45 has a storage region for storing various data used in the above-described timer function, schedule function, memo function, telephone directory function, or the like, and also has a card flag storage region 45a for storing information indicating whether or not the function mode of the main body 1 has been set to the card mode by which the function previously stored in the IC card is usable. The display drive unit 46 causes the liquid crystal display unit 13 to display the contents of the various modes such as the above-explained timer function mode and schedule function mode. Furthermore, the communication circuit unit 47 communicates signals via the connector unit 48 with the selective paging receiver unit 30 in accordance with, for instance, the full of RS 232C.

Circuit Arrangements of IC Cards

Figure 3:
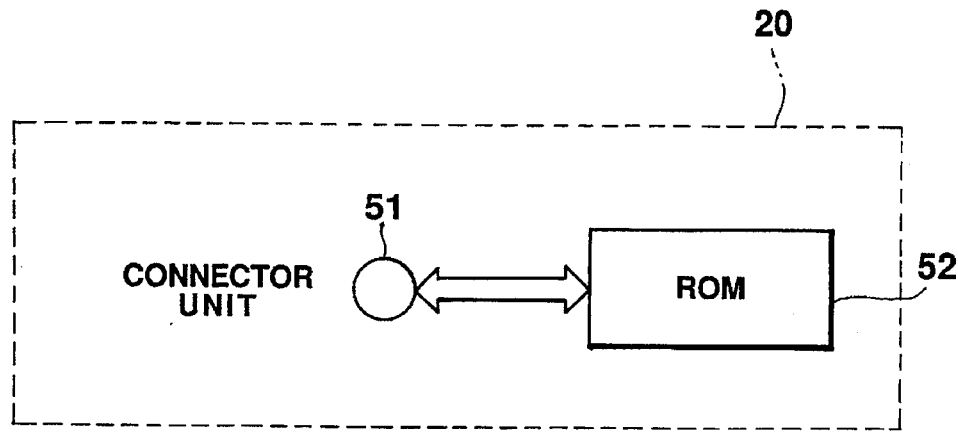
FIG. 3 is a schematic block diagram of an IC card 20 represented in FIG. 1.

FIG. 3 schematically represents a circuit arrangement of the IC card 20. The IC card 20 has a connector unit 51 arranged on an insertion surface 20a for the card loading unit 6, and a ROM 52 for previously storing the extended application program (namely, Japanese-English translation process program) and data indicative of a card name. It should be noted that arrangement of the remaining IC cards 21 and 22 are similar to the arrangement of the above IC card 20, but only storage contents thereof are different from each other.

Figure 4:
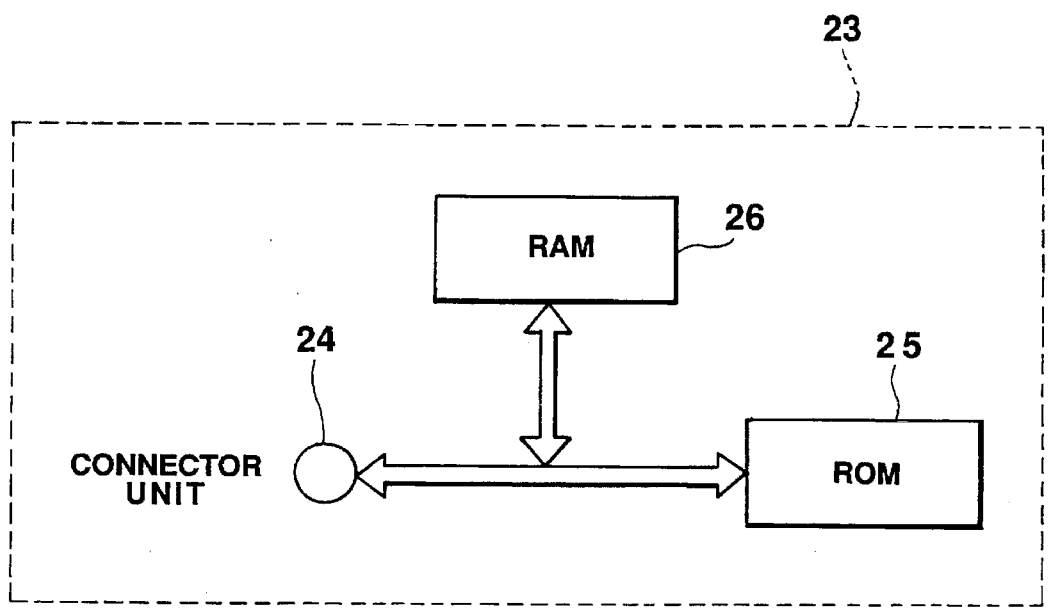
FIG. 4 is a schematic block diagram of another IC card 23 indicated in FIG. 1.

FIG. 4 schematically shows a circuit arrangement of the IC card 23. In FIG. 4, reference numeral 24 indicates a connector unit to be connected to the connector unit 43 of the card loading unit 6. This connector unit 24 is also connected to a ROM 25 and a RAM 26. The ROM 25 previously stores an application program and data about a card name and the like. This application program is used to display, edit, or correct the information stored in the selective paging receiver unit 30 on the display unit 13 of the main body 1 under control of the control unit 41, and also to store new data into the selective paging receiver apparatus 30. These data processed in accordance with the above-described various control operations, which have been sent from either the main body 1 or via this main body 1, are temporarily stored in this RAM 26.

Circuit Arrangement of Selective Paging Receiver Apparatus

Figure 5:
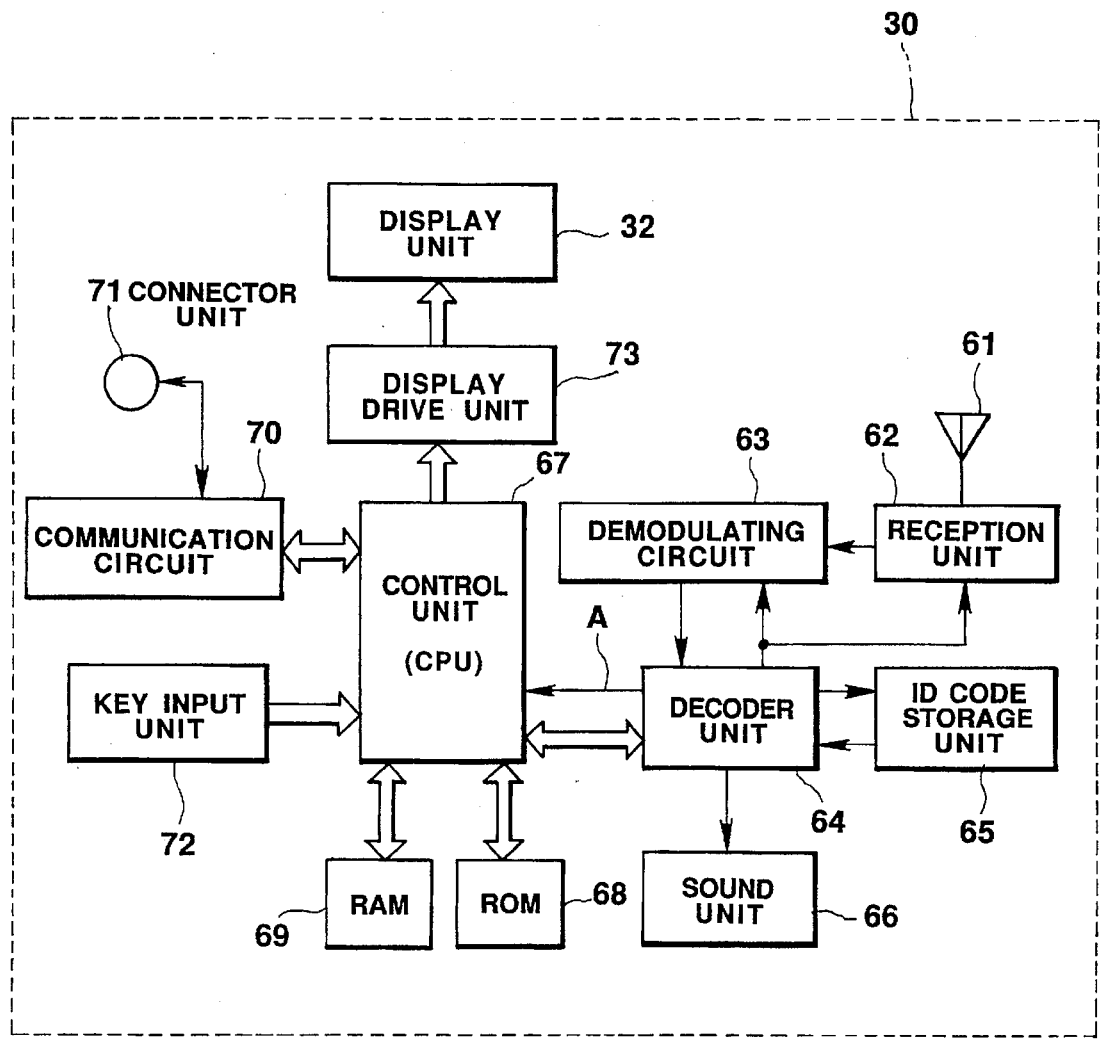
FIG. 5 is a schematic block diagram of a selective paging receiver apparatus shown in FIG. 1.
Figure 6:
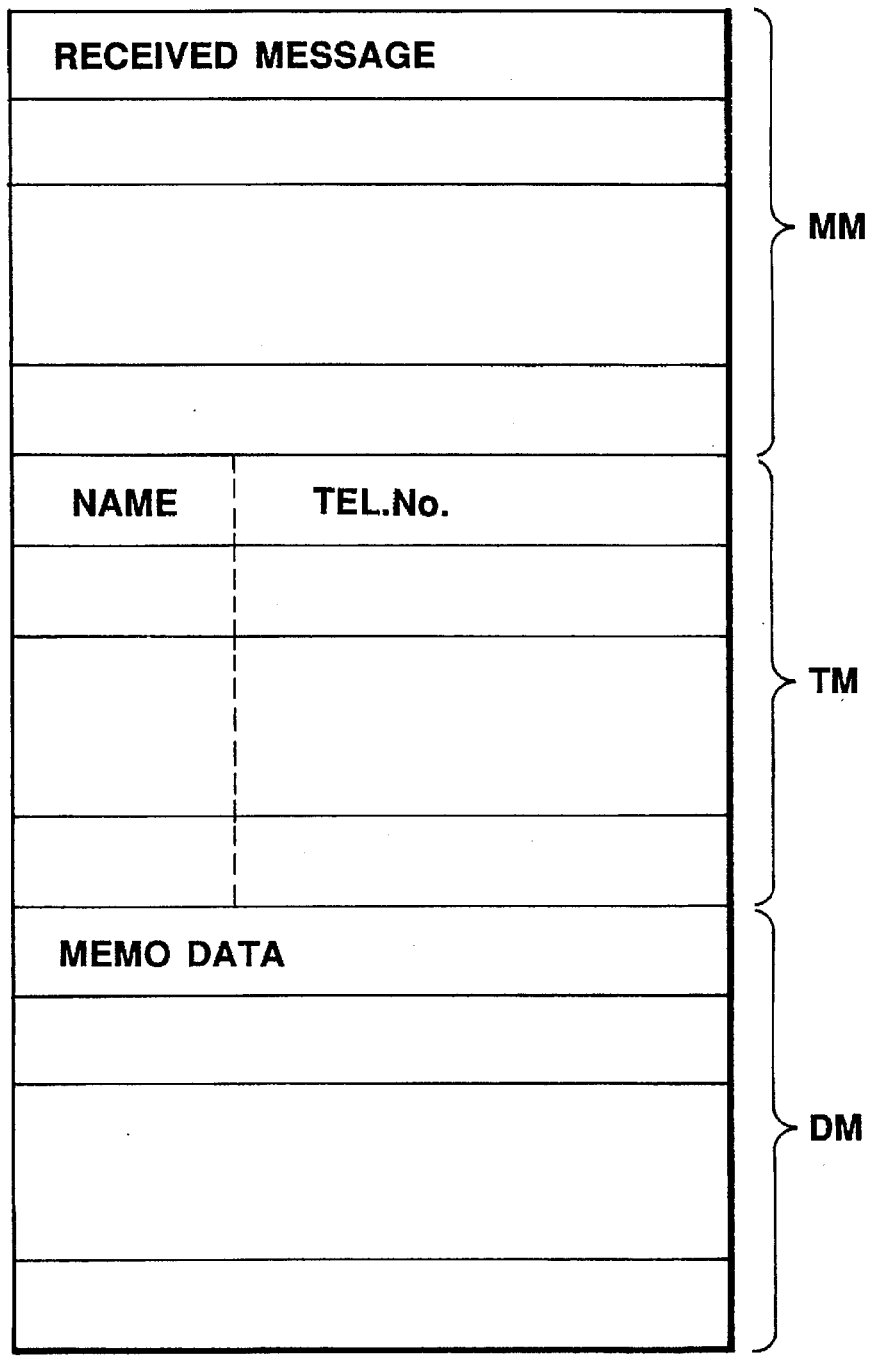
FIG. 6 schematically illustrates a memory map of a RAM 69 represented in FIG. 4.

Referring now to FIG. 5, a circuit arrangement of the selective paging receiver unit 30. This selective paging receiver unit 30 judges whether or not a paging information signal transmitted from a base station (not shown) corresponds to a signal for paging the own selective paging receiver unit, and makes a sound announcement when the transmitted signal corresponds to such a signal for paging the own selective paging receiver unit. Furthermore, this selective paging receiver apparatus 30 acquires a message information signal and stores it therein which is subsequently transmitted from the base station to this paging receiver apparatus 30, and then displays this message information.

Thus, a radio signal containing both of the paging information and the message information is inputted from the above-described base station into an antenna 61, and this inputted signal is transferred to a reception unit 62. The reception unit 62 amplifies the inputted signal and supplies the amplified signal to a demodulating circuit 63. In the demodulating circuit 63, the signal supplied from the reception unit 62 is demodulated to obtain a digital signal having "0" and "1" values, which will then be sent to a decoder unit 64.

An ID code storage unit 65 for storing a self identification (ID) code is connected to this decoder unit 64. Thus, the decoder unit 64 judges whether or not the above-described paging information corresponds to own paging information by comparing the paging information derived from the decoder unit 64 with the identification code stored in the ID code storage unit 65. In case of the own paging information, a paging detection signal "A" is supplied to a control unit 67, a sound producing unit 66 arranged by a speaker or a buzzer is driven to produce a sound, and also the subsequently transmitted message information is acquired to be sent to the control unit 67 by the decoder unit 64.

It should be noted that both of the reception unit 63 and the demodulating circuit 63 are intermittently driven by the decoder unit 64 in order to save power consumption thereof.

The control unit 67 is arranged by a microprocessor and a CPU and the like, and is connected to the decoder unit 64. Furthermore, a communication circuit unit 70 connected with a connector unit 71, a key input unit 72, and a display control unit 73 connected with a display unit 32 are connected to this control unit 67. Also, a ROM 68 and a RAM 69 are connected to the control unit 67.

The ROM 68 previously stores therein a program to control this selective paging receiver unit 30.

The RAM 69 temporarily stores therein the message information and information useful to the selective paging receiver unit 30 received via the decoder unit 64 by the antenna 61. The selective paging receiver unit 30 functions as a handy device. As shown in, for instance, FIG. 6, this RAM 69 includes a received message storage unit MM, a telephone directory data storage unit TM, and a memo data storage unit DM each of which owns a plurality of storage areas. It should be noted that names and telephone number data stored in the telephone directory data storage unit TM, and also data such as a schedule stored in the memo data message storage unit Dm are data which have been transmitted from the main body 1 via the communication circuit unit 70.

The communication circuit unit 70 transmits either the received message information, or the information stored in the RAm 69 to the main body 1 in a serial mode in accordance with a predetermined format, for instance, the rule (standard) of RS 232c, and also received the information sent from the main body 1 in a serial mode. The connector unit 71 is connected to the above-described electric connecting member 36.

Figure 7:
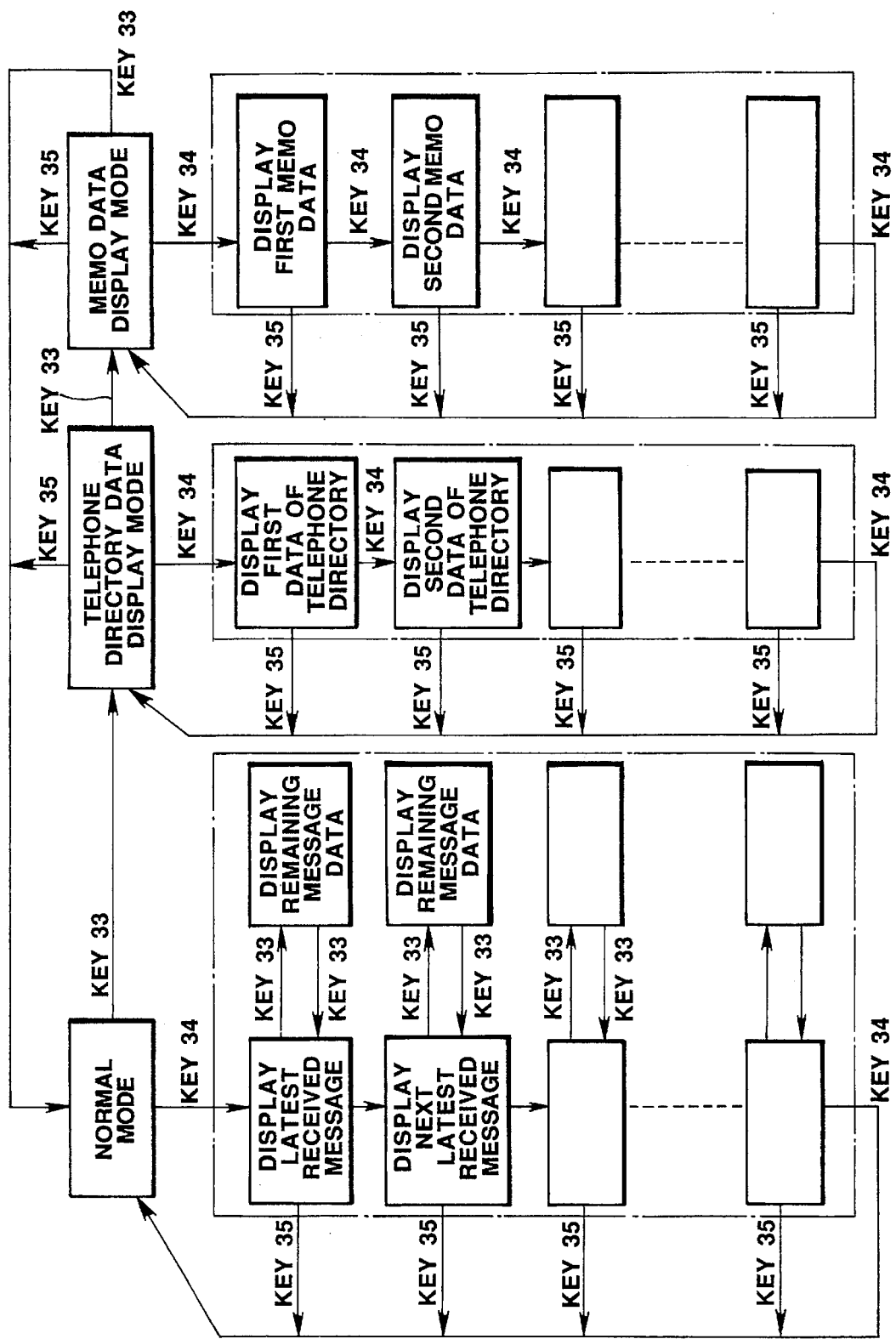
FIG. 7 represents various key functions of the selective paging receiver apparatus shown in FIG. 1.

The key input unit 72 includes the above-explained keys 33, 34 and 35. The key 33 is such a key for selecting the function mode of the selective paging receiver unit 30. Assuming now that there are three selectable function modes, i.e., the normal mode, telephone directory data display mode, and memo data display mode, the mode may be sequentially changed, as shown in FIG. 7, every time the key 33 is operated. When the mode is selected, the title of the selected mode other than the normal mode is displayed. The key 34 is such a key to sequentially change the data stored in the corresponding storage region of the RAM 69 in the selected function mode and to display the changed data on the display unit 32. For instance, while the normal mode is selected, if the key 34 is manipulated, as shown in FIG. 7, the reception messages noted in the reception message storage unit MM of the RAM 69 are sequentially displayed from the latest reception message to the past reception messages every time this key 34 is manipulated. It should be noted that when all of the reception messages selected cannot be displayed within 1 time on the display unit 32 since there are large amounts of reception message data, the remaining message data which cannot be displayed may be displayed by operating the key 33. The key 35 is such a key to reset the mode (recovery to the normal mode), reset the display (recovery to the initial display state in the respective modes), and to stop the operation of the sound producing unit 66.

The display drive unit 73 drives the display unit 32 to display either the information stored in the RAM 69 and selected by operating the key 34, or the received message information.

Overall Operation of Main Body in First Information Process Apparatus

Figure 8:
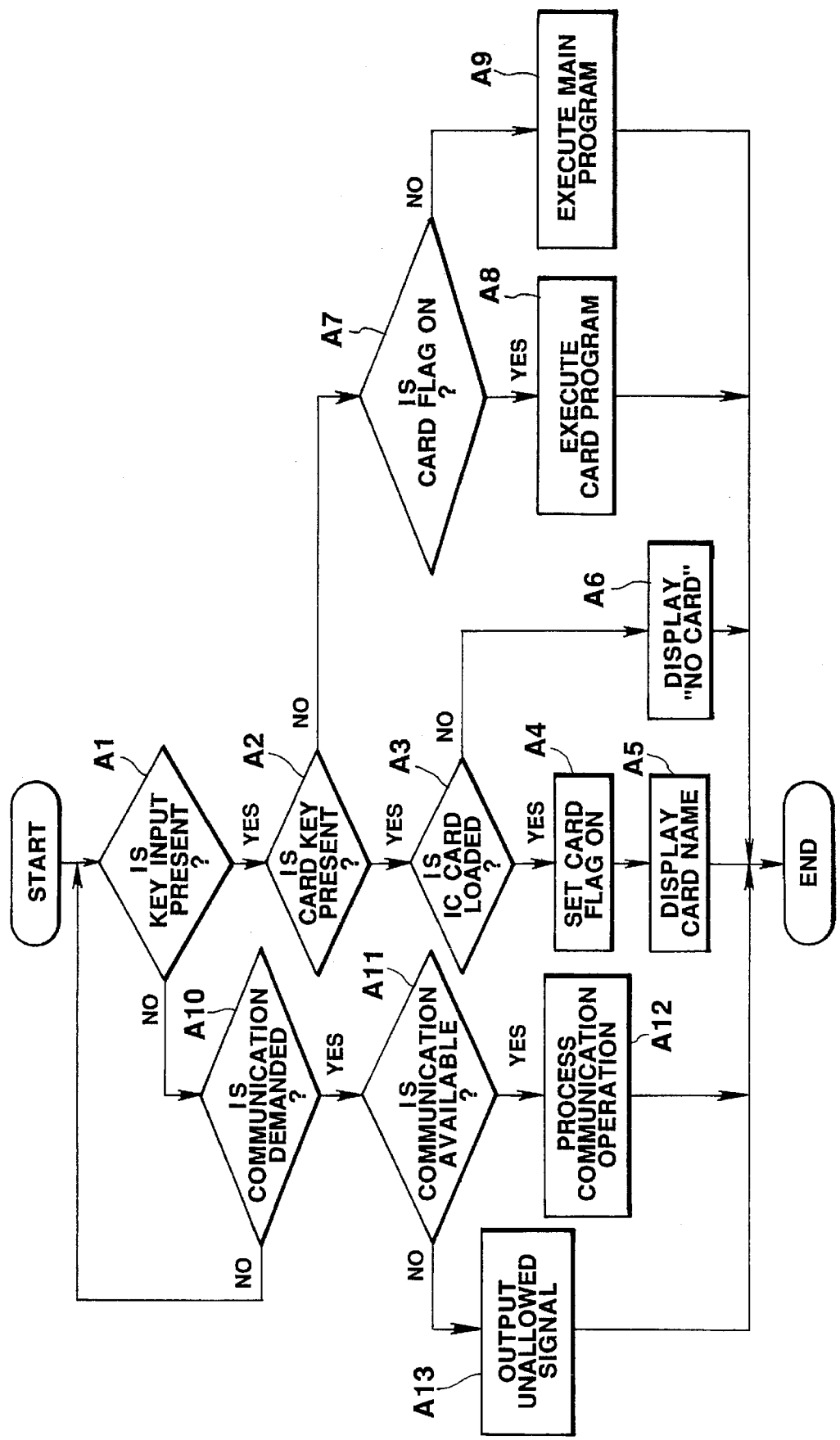
FIG. 8 is a flow chart for explaining an overall operation of the main body 1 of the information processing system shown in FIG. 1.

The main body 1 of the first information process apparatus with the above-described arrangement is operated in accordance with a flow chart shown in FIG. 8.

At a first step A1 of the flow chart shown in FIG. 8, a check is done whether or not any key employed in the key input unit 44 (see FIG. 2) is operated to input the key input instruction. When a detection is made of the operation by the key input unit 44 at the step A1, the operation process is advanced to a step A2 at which another check is done whether or not the operated key corresponds to the card key 8. If the entered key corresponds to the card key 8, the operation process is advanced to a step A3 at which a further check is done whether or not the IC card is loaded on the card loading unit 6. If the IC card is not loaded, the operation process is lumped to a step A6 at which a representation "NO IC CARD" is made on the liquid crystal display unit 13. If the IC card is loaded on the card loading unit 6, the operation process is advanced to a step A4 at which the card flag is set to "ON". In other words, "1" is stored into the card flag storage region 45a of the RAM 45, and furthermore the operation process is advanced to the next step A5 at which the card name is read out from the ROM 25 and then the read card name is displayed on the liquid crystal display unit 13.

Figure 9:
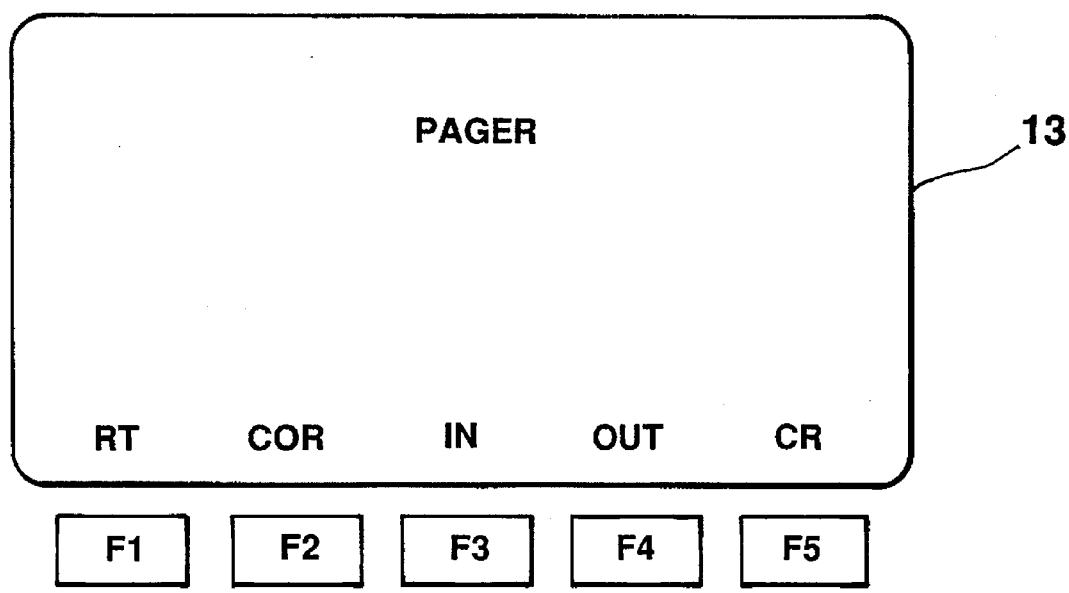
FIG. 9 shows a display example of a liquid crystal display unit employed in the main body 1 of the information processing system indicated in FIG. 1.

The representation of the card name is performed so as to display the sort of the IC card loaded on the card loading unit 6 as represented in FIG. 9 as follows: When the IC card 20 is loaded on the card loading unit 6, a title of "Japanese-English Translation" is displayed on the liquid crystal display unit 13. When the IC card 21 is loaded on the card loading unit 6, a title of "Proverb Dictionary" is represented. When the IC card 22 is loaded, a title of "Cooking Card" is displayed. Furthermore, when the IC card 23 is loaded, a title of "pager" is displayed. When the IC card 23 is loaded on the card loading unit 6 and also the selective paging receiver unit 30 is loaded to the main body 1 via the wiring line 37, various characters of "RT" (Retrieve), "COR" (Correct), "IN", "OUT" and "CR" corresponding to the F1 key to the F5 key are displayed as shown in FIG. 9.

To the contrary, if the card key 8 is not key-inputted at the step A2, then the operation process is advanced to a step A7 at which a judgement is made whether or not the card flag is set to "ON". That is, a check is done whether or not "1" is stored in the card flag storage region 45a of the RAM 45. If "1" is not stored in this region, since the selected function corresponds to any of the functions usable only in the main body 1, namely any one of the timer function, schedule function, memo function and telephone directory function, the operation process is advanced to a step A9.

At this step A9, a judgement is made of the manipulated key and the key process corresponding to the selected function by this key operation is executed in accordance with the program stored in the ROM 42.

On the other hand, when it is so judged at the step A7 that "1" has been stored in the card flag storage region 45a, the operation process is advanced to a step A8. At this step A8, a Judgement is made of the operated key, and then the key process is executed in accordance with the application program stored in the IC card loaded on the card loading unit 6.

In case that, for instance, the IC card 23 is loaded on the card loading unit 6 and such a representation as shown in FIG. 9 is made, when the F1 key is entered, the control unit 41 of the main body 1 fetches the program used to sequentially change the information stored in the RAM 69 of the selective paging receiver unit 30 and to sequentially display these information on the liquid crystal display unit 13, from the ROM 25 of the IC card 23. Furthermore, the control unit 41 causes the RAM 26 of the IC card 23 to store the information stored in the RAM 69 via the communication circuits 69 and 47, and also performs the above-described change/display operations every time the cursor operation key 19, or other key operations.

It should be noted in this process operation that a decision to fetch which sort of information stores in the RAM 69 of the selective paging receiver unit 30 is determined by operating the key 33 to set the desirable mode of the selective paging receiver unit. That is, when the set mode of the selective paging receiver unit 30 corresponds to the normal mode, all of the information stored in the reception message storage unit MM of the RAM 69 is fetched into the main body 1. When the telephone directory data display mode is set, all of the information stored in the storage unit TM is fetched, whereas when the memo data display mode is set, all of the information stored in the storage unit DM is fetched.

Similarly, when the F2 to F5 keys are manipulated, the application program stored in the ROM 25 employed in the IC card 23 is fetched and the predetermined control operation is carried out in response to the subsequent key input operation. For instance, when the F2 key is operated, the information about the telephone directory data and the like which have been stored in the RAM 69 of the selective paging receiver unit 30 is fetched into the RAM 26 so as to be corrected, and then the corrected information may be stored in the RAM 69. When the F3 key is manipulated, the information related to the reception message and the like which have been stored in the RAM 69 of the selective paging receiver unit 30 may be stored in the RAM 45 of the main body 1. When the F4 key is operated, either the telephone directory data, or the schedule data, which have been stored in the RAM 45 employed in the main body 1 is selected and thereafter stored into a preselected storage unit of the RAM 69. The F5 key is to clear the data stored in the RAM 69.

It should be noted that if the IC card 23 is loaded on the card loading unit 6, the process operation according to the program stored in the ROM 25 of the IC card 23 is performed when not only the key input operation is effected in the main body 1, but also the interrupt operation is made by the selective paging receiver unit 30. Precisely speaking, when a judgement is made that no key input operation is performed at the step A1, the operation process is advanced to a step A10 at which a check is done whether or not a communication request signal is produced from the selective paging receiver unit 30. When no such a communication request signal is produced from the selective paging receiver unit 30, no further operation is made. To the contrary, when the communication request signal is issued, the operation process is advanced to the next step A11. At this step A11, a check is done whether or not the communication is available. If a judgement is made that the communication is available, namely if the IC card 23 is loaded on the card loading unit 6 and also any of these functions are brought into the non-operation state, otherwise even if any of these functions is brought into the operation condition, but this operation may be temporarily interrupted, the operation process is advanced to a step A12. At this step A12, an allow signal is outputted to the selective paging receiver unit 30, the information derived from the selective paging receiver unit 30 is fetched and then transferred to the RAM 26 of the IC card 23 so that the predetermined communication process is executed. Conversely, when another judgement is made that the communication is not available, the operation process is advanced to a step A13 at which an unallowable signal is outputted to the selective paging unit 30.

Operation of Selective Paging Receiver Unit

Figure 10:
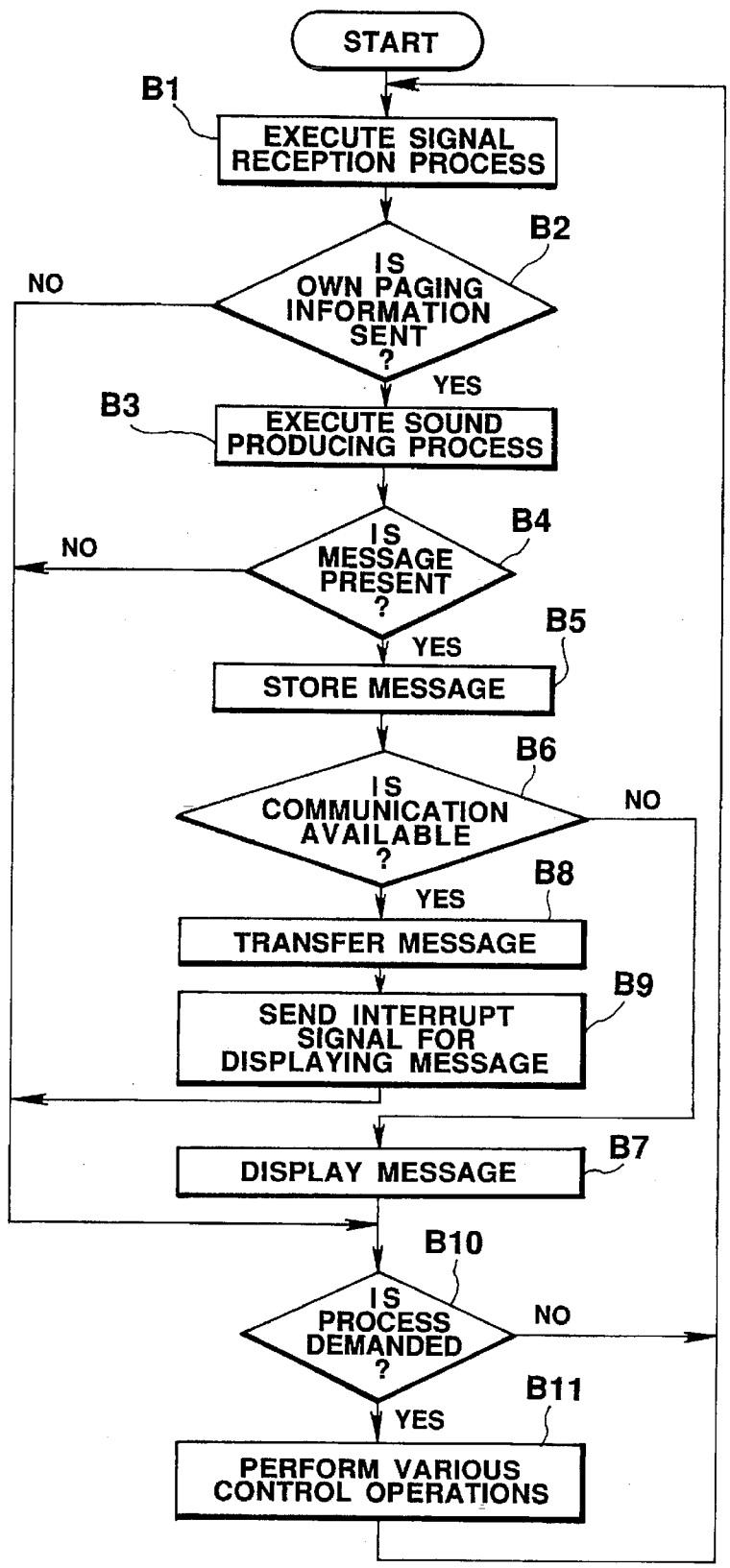
FIG. 10 is a flow chart for explaining an operation of the selective paging receiver apparatus indicated in FIG. 1.

Referring now to a flow chart shown in FIG. 10, operations of the selective paging receiver unit 30 represented in FIG. 5 will be described more in detail.

In this flow chart, a first step B1 corresponds to such a reception process that a radio communication signal is received from the base station. This reception process is carried out by utilizing the reception circuit 62 and the demodulating circuit 63. Subsequently, at the next step B2, a detection is made by the decoder unit 64 that the received paging information corresponds to the own paging information. Then, the operation process is advanced to a step B3 at which the sound producing unit 66 is driven to produce the sound and also the paging detection signal is supplied to the control unit 67. As a result, the control unit 67 judges whether or not the message information is subsequently sent. If the subsequent message information is transmitted, then this message information is stored into the reception message storage region MM of the RAM 69 at a step B5.

Further at a step B6, the selective paging receiver unit 30 outputs the communication request signal via the communication circuit 69 under communication with the main body 1, and also judges whether or not the allow signal is returned from the main body 1 via the communication circuit 69 within a predetermined time period. If the selective paging receiver unit 30 is not brought into the communication condition, the operation process is advanced to a step B7 at which the message information which has been stored in the reception message information storage region MM of the RAM 69 is displayed on the display unit 32. If a large amount of the message information has been stored in the reception message storage unit MM of the RAM 69 and therefore all of these message information cannot be entirely displayed within one display, then these message information may be separated and sequentially displayed by operating the key 34 in the above-described manner.

At the step B6, when another judgement is made that the communication is available, the operation step is advanced to a step B8. At this step B8, the reception message information which has been stored in the reception message storage unit MM of the RAM 69 is sent to the RAM 26 of the IC card 23 so as to be stored therein. Then, at a step B9, an interrupt signal is sent to the control unit 41 of the main body 1 by which the message information transferred and stored in the RAM 26 is entirely represented on the liquid crystal display unit 13 of the main body 1 in accordance with the program stored in the ROM 25.

Upon receipt of the above-described interrupt signal sent from the selective paging receiver unit 30, when "1" is stored in the card flag storage region 45a, and the above-described message information which has been fetched in the RAM 26, is entirely displayed within one time on the liquid crystal display unit 13 of the main body 1 by the control unit 41 of the main body 1 in accordance with the program stored in the ROM 25. It should be noted that even when other function is operated, this operation may be interrupted and also the process information for entirely displaying all of the message information on the liquid crystal display unit 13 of the main body 1, may be executed.

After the process operations defined at the step B7 and B9, or if the judgement results become "NO" at the steps B2 and B4, the operation process is advanced to a step B10. At this step B10, a check is done whether or not any of process demands is issued based upon either the key operation of the keys such as the F1 key to F5 key employed in the main body 1, or the key operation of the keys employed in the selective paging receiver unit 30. If such a demand is made, then the operation process is advanced to the next step B11 at which the corresponding control operation to this key operation is performed. That is, the information stored in the RAM 69 is transferred to the main body 1, the information read out from the main body 1 is stored into the RAM 69, the modes of the selective paging receiver unit 30 are changed, and also the information stored in the RAM 69 is displayed on the display unit 32. After these control operations have been completed, the operation process is returned to the previous step B1.

As previously described, in accordance with the first information process apparatus, the information process apparatus is connected to the selective paging receiver unit 30 via the detachable communication wire, and the IC card to which the application program for controlling the information stored in the selective paging receiver unit 30 has been stored, is loaded to the information process apparatus as the extended function IC card. Also, the information stored into the selective paging receiver unit 30 is read, displayed and corrected in the information process apparatus, and furthermore the information which has been stored into the information process apparatus, or inputted into the information process apparatus, is caused to be stored into the RAM of the selective paging receiver unit 30. As a consequence, even if the selective paging receiver unit 30 per se is made compact and in a light weight, the received messages can be displayed at a high efficiency, and also the telephone directly data and the like useful for the selective paging receiver unit 30 can be effectively stored and displayed.

Construction of Second Information Process System

Referring now to FIGS. 11 to 15, a construction of an information process system according to a second preferred embodiment of the present invention will be described.

A major feature of this second information process system is such that both of a radio unit having a function to receive/display message information and a storage medium are arranged as a single unit. The storage medium stores an application program used to process information such as reception information stored in the radio unit and processed by an information process apparatus. More specifically, the particular point of the second information process system is such that the above-described application program is stored into the radio unit per se, and also only this radio unit is physically connected to the information process apparatus. The different points between the first information process system and the second information process system are 1). a connecting structure between a selective paging receiver unit and the information process apparatus, and 2). a shape of this selective paging receiver unit. As a consequence, the same reference numerals shown in the first information process system will be employed as those for denoting the same, or similar constructive elements in the second information process system, and detailed descriptions thereof are omitted.

Figure 11:
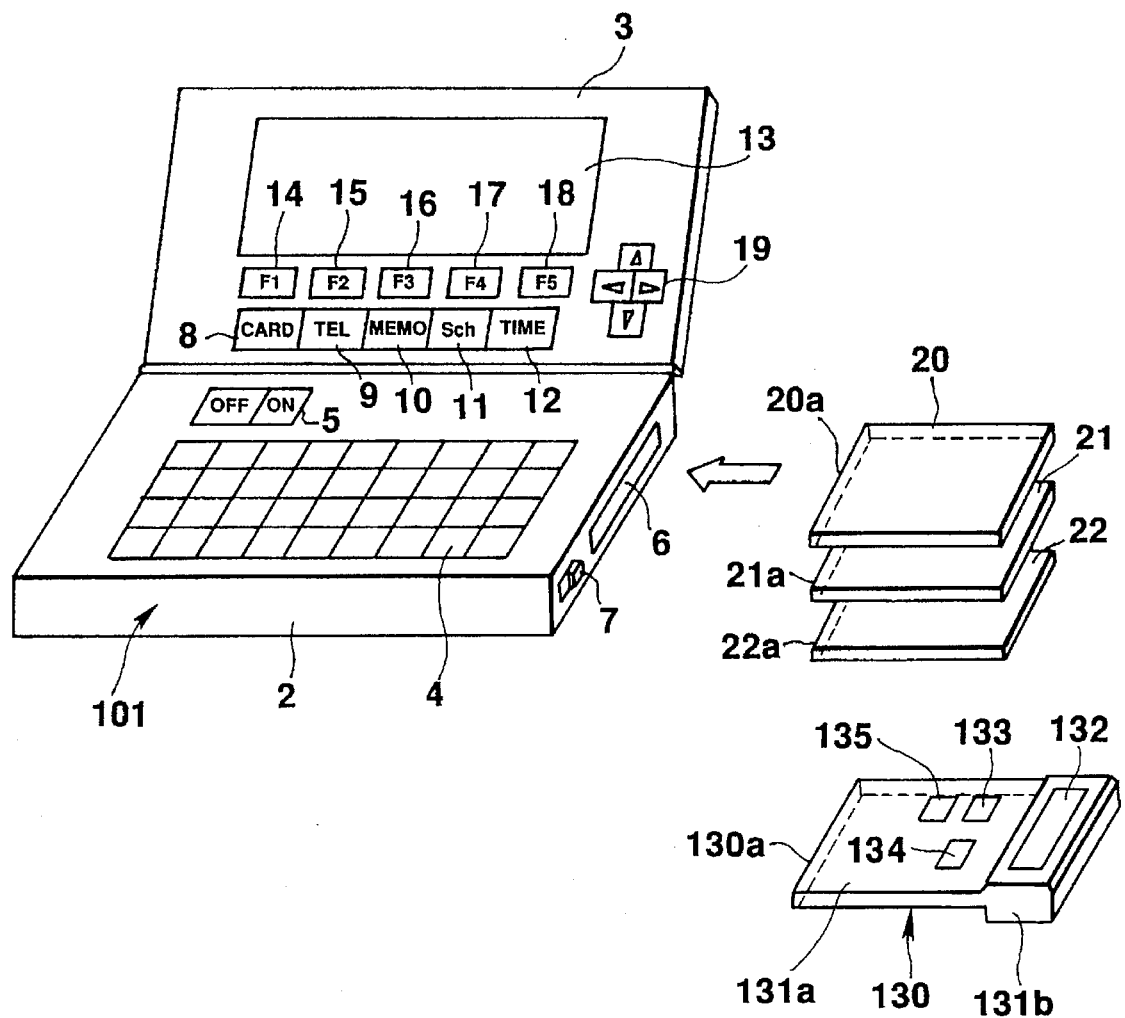
FIG. 11 is a perspective view of a second system arrangement of an information processing system according to the present invention.

In FIG. 11, there is shown a perspective view of the second information process system. In the second information process system of FIG. 11, reference numeral 101 indicates a main body of the information process apparatus. This main body 101 has the substantially same construction as that of the main body 1 of the information process apparatus employed in the first preferred embodiment. As apparent from the comparison between the structures shown in FIGS. 1 and 11, the information process apparatus of the second preferred embodiment corresponds to the main body 1 of the information process apparatus as explained in the first preferred embodiment, from which the jack 2a is merely omitted. That is, the main body 101 of the second information process system, is arranged by a base body 2, a lid body 3, and owns a keyboard 4, a large-screen-sized liquid crystal display unit 13, a card loading unit 6 for loading expanded function IC cards such as the IC cards 20, 21 and 22 are described in the first preferred embodiment, a card key 8 for selecting a card mode, and also other function keys 9 to 12, 14 to 19.

Figure 12:
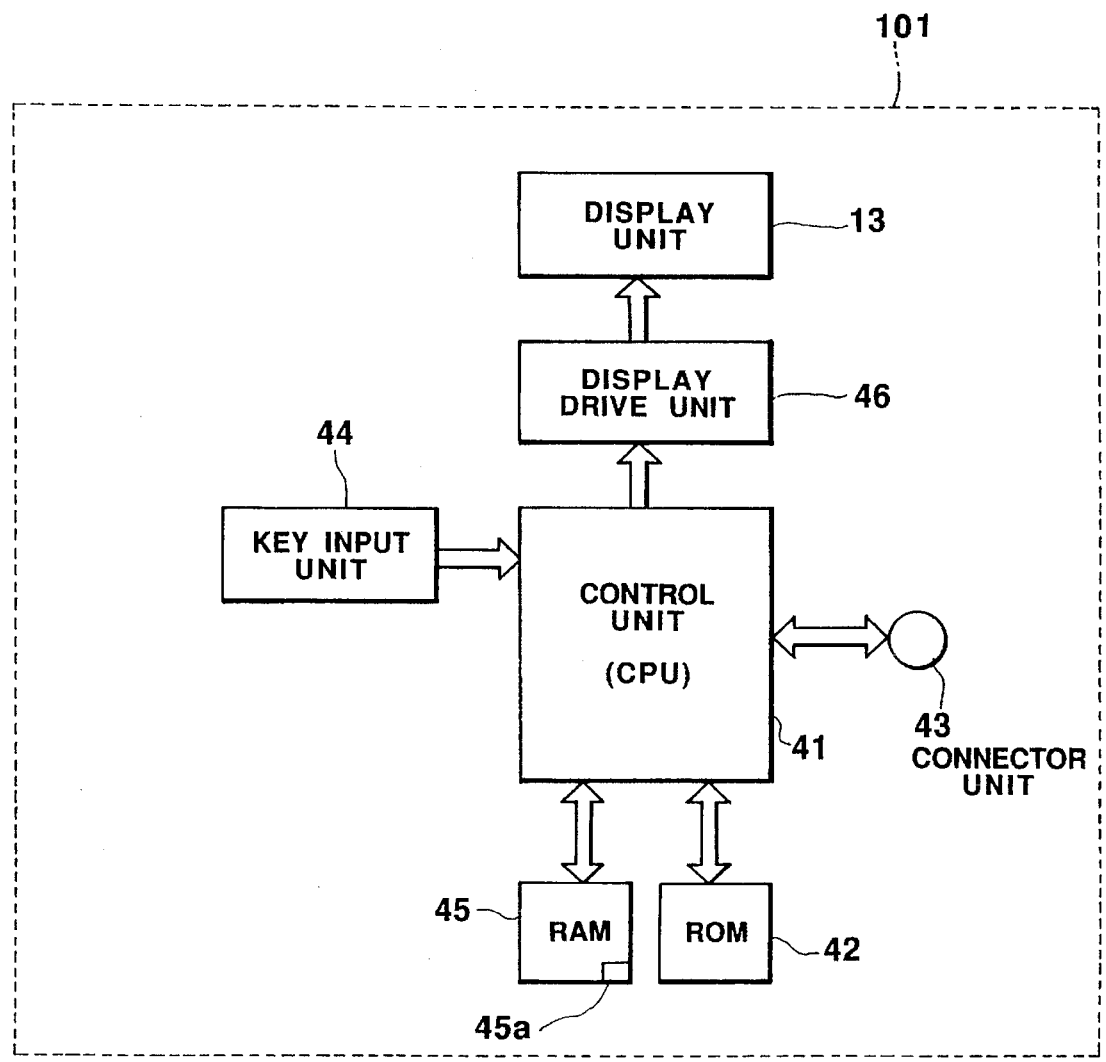
FIG. 12 is a schematic block diagram of a main body of the information processing apparatus shown in FIG. 11.

Circuit Arrangements of Information Process Apparatus/Selective Paging Receiver Unit FIG. 12 is a schematic block diagram of an internal circuit arrangement for the main body 101 of the information process system. The circuit arrangement of this main body 101 is very similar to that of the main body 1 shown in FIG. 2. In other words, the internal arrangement of the main body 101 is identical to that of the main body 1 except for the connector 48 and the communication circuit 47. As represented in FIG. 2, this main body 101 of the second information process system includes a control unit ((CPU) 41, and a ROM 42 for previously storing a program to execute by the control unit 41), a time function a schedule function, a telephone directory function, a telephone directory function and a memo function; another program to execute an extended function application program stored in the IC card; and display character data and the like. Furthermore, the main body 101 includes a RAM 45 having storage regions for storing various data used in the above-described time function, schedule function, telephone directory function and memo function, and also a card flag storage region.

In FIG. 11, there is also shown a selective paging receiver unit 130 corresponding to a sort of the above-described radio unit. This selective paging receiver unit 130 is constructed in an integral form by a flat plate portion 131a having the same shape as that of the above-explained IC cards 20, 21 and 22, and also containing a circuit board (not shown in detail); and a thick wall portion 131b having a thicker wall than that of the flat plate portion 131a, for containing a dot matrix type display unit 132 and a battery (not shown in detail). The same type of connector mounted on each of the tip surfaces 20a, 21a, 22a of the IC cards 20, 21, 22 is provided at a tip surface 130a of the flat plate portion 131, so that this selective paging receiver unit 130 can be loaded on the card loading unit 6 of the main body 101, which is similar to that of the above-described IC cards 20, 21 and 22. There are also provided keys 133, 134 and 135 having the same functions of the above-described keys 33, 34 and 35 on an upper surface of the flat plate unit 131a.

Figure 13:
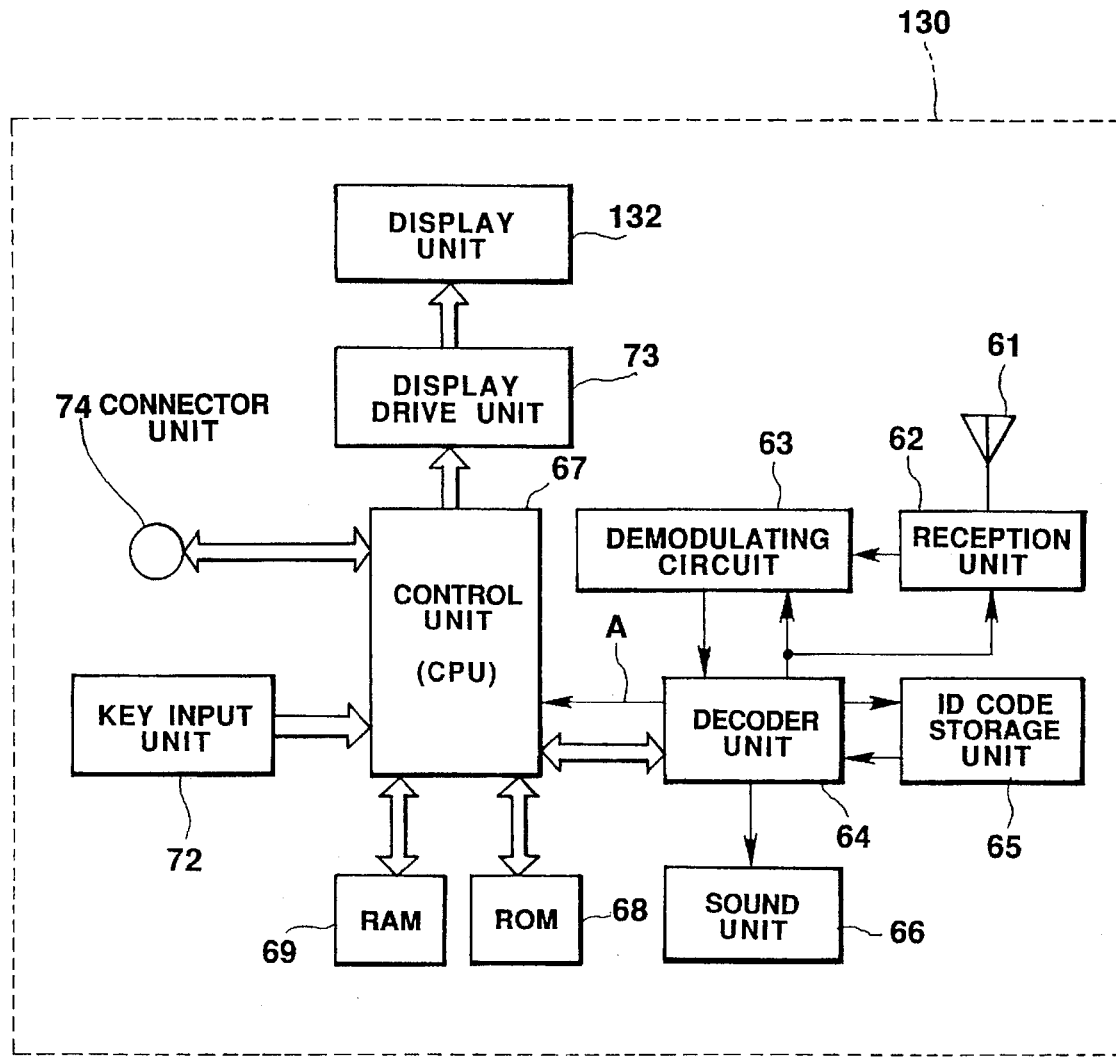
FIG. 13 is a schematic block diagram of a selective paging receiver apparatus shown in FIG. 11.

FIG. 13 represents a circuit arrangement of an electronic circuit employed in this selective paging receiver unit 130. As apparent from a comparison result between the electronic circuits shown in FIGS. 5 and 13, in the electronic circuit of this second selective paging receiver unit 130, a connector unit 74 is employed instead of the communication circuit 70 and the connector unit 71 of the first selective paging receiver unit 30, and is directly connected to the control unit 67. It should be noted that this connector unit 74 corresponds to the above-explained connector provided on the tip surface of the flat plate unit 130a.

The remaining arrangement of the second selective paging receiver unit 130 is identical to that of the first selective paging receiver unit 30 shown in FIG. 5, except that an application program for performing the following various controls has been stored in the control unit 41 of the main body 101. That is, the information stored in the RAM 69 of the second selective paging receiver unit 130 is corrected, or displayed on the display unit 13 of the main body 101, and furthermore data is newly stored into the RAM 69.

Operation of Second Information Process System

Referring now to a flow chart shown in FIG. 14, the main body 101 of the second information process system with the above-described arrangement will be described.

Figure 14:
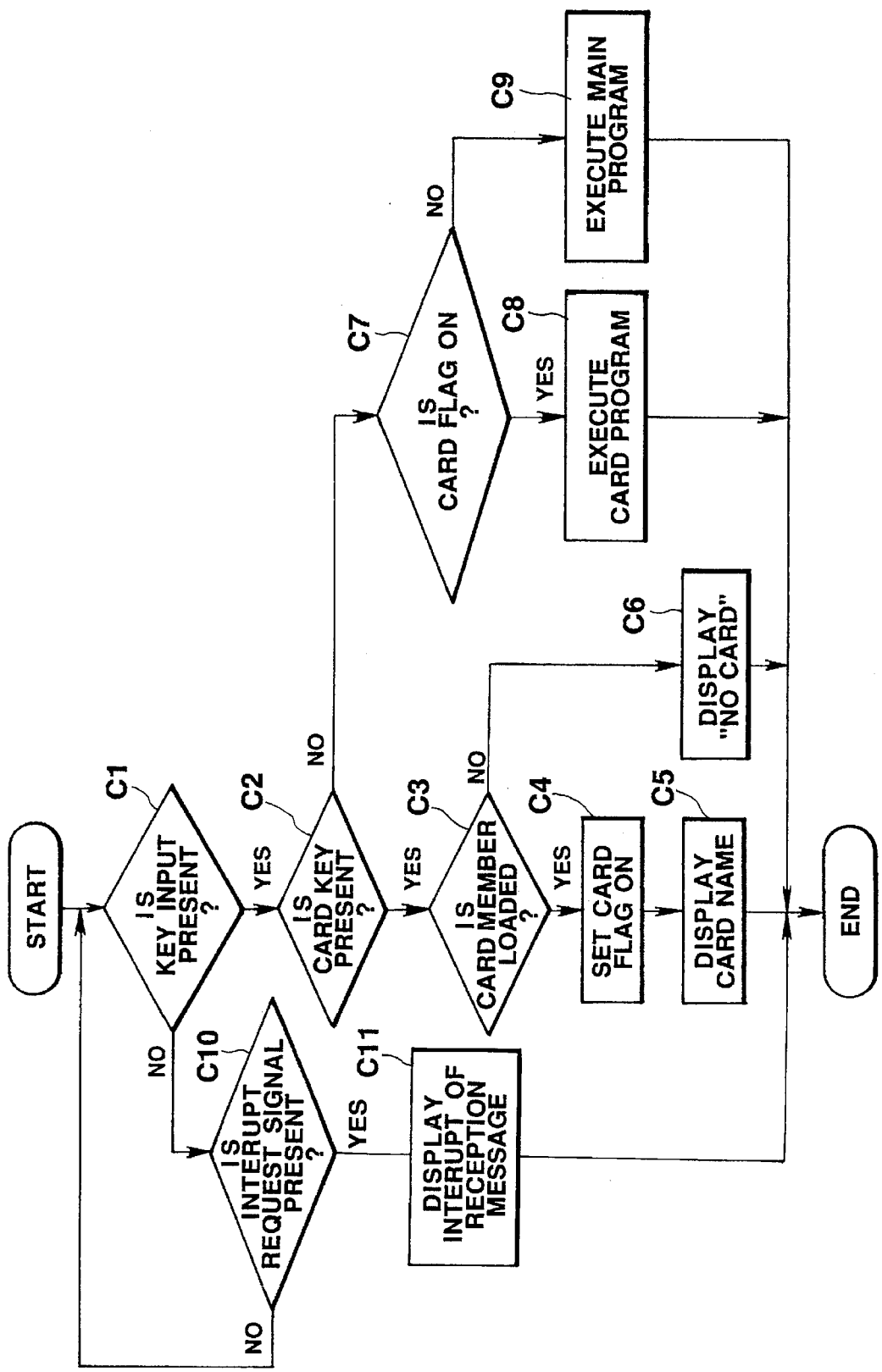
FIG. 14 is a flow chart for representing an overall operation of the main body 1 of the information processing system shown in FIG. 11; and, FIG. 15 is a flow chart for explaining an operation of the selective paging receiver apparatus represented in FIG. 11.

In the flow chart of FIG. 14, a check is made at a first step C1 whether or not any one of the key input unit 44 is operated. If a judgement is made that any one of the key input unit 44 is operated ("YES"), then the process operation is advanced to a further step C2 at which a further check is done whether or not the operated key corresponds to the card key 8. At this step C2, if it is judged that the input key corresponds to the card key 8, then the process operation is advanced to a step C3. At this step C3, a check is done whether or not the card member, namely the IC card 20, 21, 23, or the second selective paging receiver unit 130 is loaded on the card loading unit 6. If such a card member is not loaded, the operation process is jumped to a step C6 at which a representation "NO IC CARD" is made on the liquid crystal display unit 13. Conversely, if the IC card is loaded on the card loading unit 6, the operation process is advanced to a step C4 at which the card flag is set to "ON". In other words, "1" is stored into the card flag storage region 45a of the RAM 45, and furthermore the operation process is advanced to the next step C5 at which the card name is read out from the ROM and then the read card name is displayed on the liquid crystal display unit 13.

The representation of the card name is performed so as to display the sort of the card member loaded on the card loading unit 6, as follows: When the card member loaded on the card loading unit 6 is the IC card 20, a title of "Japanese-English Translation" is displayed on the liquid crystal display unit 13. When the IC card 21 is loaded on the card loading unit 6, a title of "Proverb Dictionary" is represented. When the IC card 22 is loaded, a title of "Cooking Card" is displayed. Furthermore, when the second selective paging receiver unit 130 is loaded, a title of "pager" is displayed. Also, various characters "RT", "COR", "IN", "OUT" and "CR" corresponding to the F1 key to the F5 key are displayed. That is, such a representation shown in FIG. 9 is made as in the first preferred embodiment wherein the representation is made when both of the IC card 23 and the first selective paging receiver unit 30 are loaded on the loading unit at the same time.

To the contrary, if the card key 8 is not key-inputted at the step C2, then the operation process is advanced to a step C7 at which a judgement is made whether or not the card flag is set to "ON". That is, a check is done whether or not "1" is stored in the card flag storage region 45a. If "1" is not stored in this region, since the selected function corresponds to any of the functions usable only in the main body 101, namely any one of the timer function, schedule function, memo function and telephone number function, the operation process is advanced to a step C9.

At this step C9, the key process corresponding to the selected function by this key operation is executed in accordance with the program stored in the ROM 42 employed in the main body 101.

On the other hand, when it is so judged at the step C7 that "1" has been stored in the card flag storage region 45a, the operation process is advanced to a step C8. At this step C8, a judgement is made of the operated key, and then the key process is executed in accordance with the application program stored in the card member loaded on the card loading unit 6.

In case that, for instance, the second selective paging receiver unit 130 is loaded on the card loading unit 6, when the F1 key is entered the control unit 41 of the main body 101 fetches the program used to sequentially change the information stored in the RAM 69 of the second selective paging receiver unit 130 and to sequentially display these information on the liquid crystal display unit 13, from the ROM 25 of the IC card 23. Furthermore, the control unit 41 performs the above-described change/display operations every time the cursor moving key 19, or other key is operated.

It should be noted that in this display process, a decision to select which sort of information among the information stored in the RAM 69 employed in the second selective paging receiver unit 130, is made by operating either the keys provided on the second selective paging receiver unit 130, or the keys provided on the main body 101. For example, when this selection is performed by operating the keys employed in the second selective paging receiver unit 130, before this second paging receiver unit 130 is loaded on the card loading unit 6 of the main body 101, the mode selecting key (key 133) mounded on the second selective paging receiver unit 130 is operated to set any one of the normal mode, the telephone directory data display mode, and the memo data display mode in accordance with a desired sort of information to be displayed. When the selection is made by operating the keys employed in the main body 101, such a program may be previously set to the above-described application program stored in the ROM 68 of the second selective paging receiver unit 130 as a portion of the application program, that any one of the reception message display mode to display the data stored in the reception message storage region MM of the RAM 69, the telephone directory data display mode to display the data stored in the telephone directory data storage region TM, and the memo data display mode to display the data stored into the memo data storage region DM is selected by operating the key employed in the main body 101, and then this key may be operated before, or after the F1 key is manipulated.

Similarly, when the F2 to F5 keys are manipulated, the application program stored in the ROM 68 employed in the second selective paging receiver unit 130 is fetched and a predetermined control operation is carried out in response to the subsequent key input operation. For instance, when the F2 key is operated, the application program of correction process is fetched, and the information about the telephone directory data displayed on the display unit 13 is corrected and then the corrected information may be stored in the original storage region of the RAM 69. When the F3 key is manipulated, the information related to the reception message and the like which have been stored in the RAM 69 of the second selective paging receiver unit 130 may be stored in the RAM 45 of the main body 101. When the F4 key is operated, either the telephone directory data, or the schedule data, which have been stored in the RAM 45 employed in the main body 1 may be selected and thereafter stored into a preselected storage region of the RAM 69 of the second selective paging receiver unit 130. The F5 key is to clear the data stored in the RAM 69.

It should be noted that if the second selective paging receiver unit 130 is loaded on the card loading unit 6, the process operation according to the application program stored in the ROM 68 of the second selective paging receiver unit 130 is performed when not only the key input operation is effected in the main body 101, but also the interrupt operation is made by this second selective paging receiver unit 130. Precisely speaking, when a judgement is made that no key input operation is performed at the step C1, the operation process is advanced to a step C10 at which a check is done whether or not an interrupt request signal is produced from the second selective paging receiver unit 130. When no such an interrupt request signal is produced from the second selective paging receiver unit 130, no further operation is made. To the contrary, when the interrupt request signal is issued, the operation process is advanced to the next step C11. At this step C11, the interrupt operation is performed even when other function is operable, so that this operation is once stopped. Then, such a process is carried out that all of the latest reception message information stored in the reception message storage region MM of the RAM 69 in the second selective paging receiver unit 130 are entirely displayed in accordance with the application program sent from the second selective paging receiver unit 130.

Operation of Second Selective Paging Receiver Unit

Figure 15:
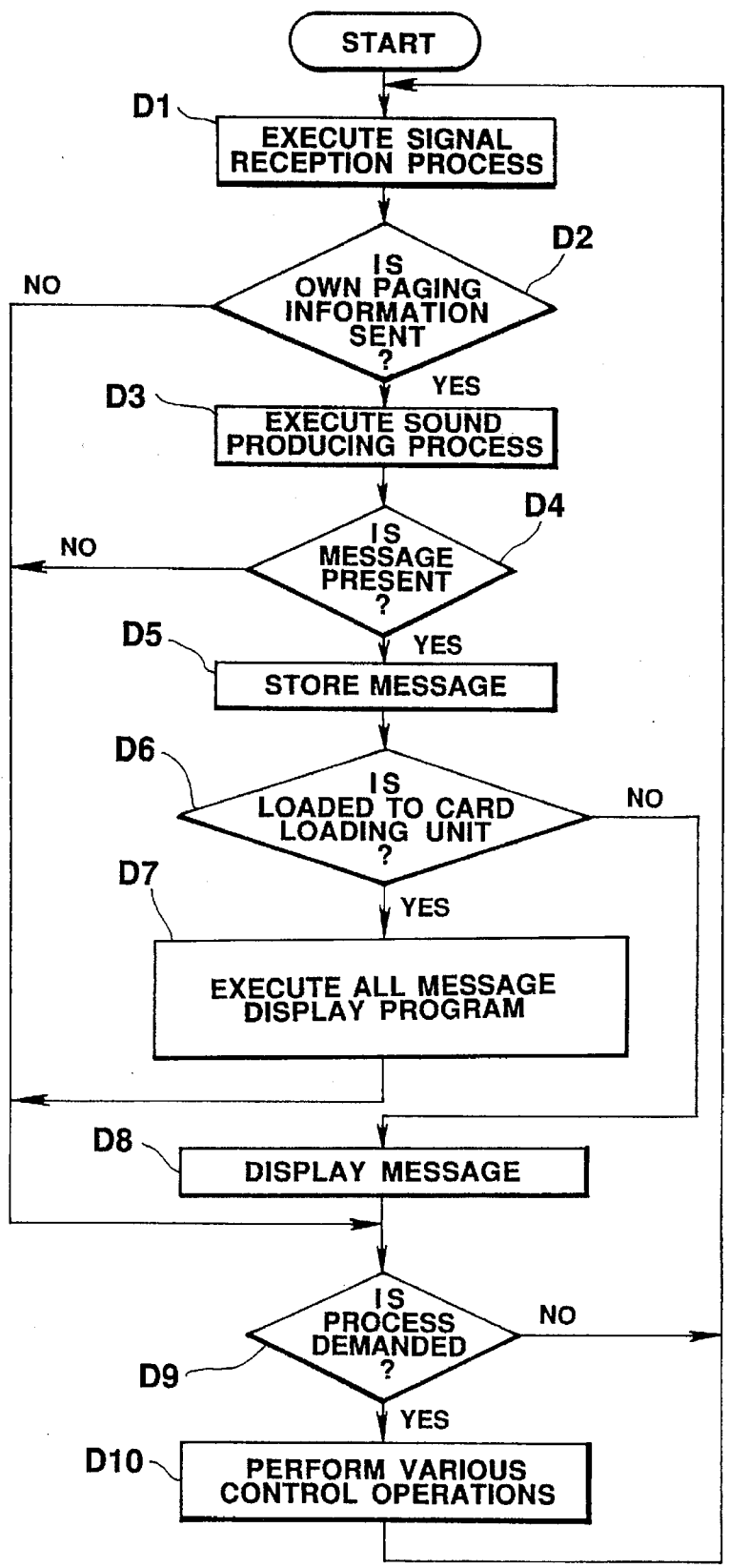

Referring now to a flow chart shown in FIG. 15, operations of the second selective paging receiver unit 130 represented in FIG. 13 will be described more in detail.

In this flow chart, a first step D1 corresponds to such a reception process that a radio communication signal is received from the base station. This reception process is carried out by utilizing the reception circuit 62 and the demodulating circuit 63 under control of the decoder unit 64. Subsequently, at the next step D2, a detection is made by the decoder unit 64 that the received paging information corresponds to the own paging information. Then, if a judgement is made that the paging information contained in the received signal the operation process is advanced to a step D5 at which the sound producing unit 66 is driven to produce the sound and also the paging detection signal is supplied to the control unit 67. As a result, the control unit 67 judges whether or not the message information is subsequently sent. If the subsequent message information is transmitted, then this message information is stored into the reception message storage region MM of the RAM 59 at a step D5.

Further at a step D6, a judgement is made whether or not the second selective paging receiver unit 130 is loaded to the card loading unit 6 of the main body 101. This judgement is performed by checking, for instance, whether or not a power source voltage signal is actually supplied from a connector pin corresponding to a power source voltage supply terminal of the connector unit 43 mounted on the card loading unit 6 of the main body 101. If a judgement is done that the second selective paging receiver unit 130 is not loaded on the card loading unit 6 of the main body 101 ("NO"), then the process operation is advanced to a further step D8 at which the reception message information stored in the reception message storage region MM of the RAM 69 is displayed on the display unit 132. If a large amount of the message information has been stored in the reception message storage unit MM of the RAM 69 and therefore all of these message information cannot be entirely displayed within one display on the liquid crystal display unit 132 of the receiver unit 130, then these message information may be separated and sequentially displayed by operating the key 133 similar to the above-described first preferred embodiment.

At the step D6, when another judgement is made that the second selective paging receiver unit 130 is loaded on the card loading unit 6 of the main body 101, the operation step is advanced to a step D7. At this step D7, the program for entirely displaying both of the interrupt demand signal and the reception message information stored in the reception message storage region MM of the RAM 69 is read out from the ROM 68 and thereafter sent to the control unit 41 of the main body 101.

As previously explained at the step C11 shown in FIG. 14, upon receipt of the above-described interrupt demand signal, an interrupt operation is performed by the control unit 41 of the main body 101 even when other function is under use, so that the operation defined by this function is once stopped, and also all of the reception message information stored in the reception message storage region MM of the RAM 69 are entirely displayed on the liquid crystal display unit 13 of the main body 101. It is, of course, possible to display this received message in a real time mode by utilizing the liquid crystal display unit 13 of the main body 101, which has been stored in the reception message storage region MM of the RAM 69, only when the function mode of the main body 101 is selected to be the card mode. In this case, since not only the judgement at the step D6 whether or not the second selective paging receiver unit 130 has been loaded on the card loading unit 6 of the main body 101, but also the judgement whether or not the function mode of the main body 101 is selected to be the card mode must be performed, a method for confirming whether or not "1" has been stored in the card flag storage region 45a of the main body 101 is needed to be introduced, instead of the above-described method for detecting the power source voltage signal.

After the process operation defined at the step D7 or D8, or if the judgement results become "NO" at the steps D2 and D4, the operation process is advanced to a step D9. At this step D9, a check is done whether or not any of process demands is issued based upon either the key operation of the keys such as the F1 key to F5 key employed in the main body 101, or the key operation of the keys 133, 134 and 135 employed in the second selective paging receiver unit 130. If such a demand is made, then the operation process is advanced to the next step D10 at which the corresponding control operation to this key operation is performed. That is, either the program stored in the ROM 68, or the information stored in the RAM 69 is transferred to the main body 101, the information read out from the main body 101 is stored into the RAM 69, the modes of the selective paging receiver unit 130 are changed, and also the information stored in the RAM 69 is displayed on the display unit 132. After these control operations have been completed, the operation process is returned to the previous step D1.

As previously described, in accordance with the second information process apparatus, since the application program to control the information stored in the second selective paging receiver unit 130 under the control unit 41 of the second information process system is stored into this second selective paging receiver unit 130 per se, and also the shape of the second selective paging receiver unit 130 is made of such a shape capable of loading this receiver unit 130 on the card loading unit 6 of the main body 101 for the second information process system, the various processes can be simply performed in such a manner that the information stored in the selective paging receiver unit 130 may be read out and displayed on the second information process system, or corrected, otherwise the information stored in the second selective paging receiver unit 130 or inputted by the second information process system may be stored in the second selective paging receiver unit 130, as compared with the first information process system.

Modifications

As apparent from the foregoing descriptions, the present invention is not limited only to the above-described first and second preferred embodiments, but may be modified, changed or substituted without departing from the technical scope of the present invention.

For instance, although the "electronic notebook" has been employed as the first and second information process systems in the first and second preferred embodiments, any other types of information process systems such as a personal computer and a wordprocessor may be employed which are equipped with a large-screen-sized display unit and a key entry means capable of easily entering character/ numeral data, e.g., a keyboard.

Furthermore, as the application program used to cause the information process system to process the information stored in the radio unit such as the selective paging receiver unit, there are not only the above-explained program, but also a program used to fetch the reception message information into the main body of the information process system so as to rearrange, edit and represent this message information in a graph, and furthermore a program for applying to the selective paging receiver unit, such a function for storing the received message in accordance with the classification thereof, and also a program for rewriting the ID code of the selective paging receiver unit.

Then, the radio unit connected to the information process system is not limited to the above-described paging receiver, namely a receiver having exclusively a receiving function, but such a unit capable of receiving and storing the message information, and also of displaying this message information may be utilized. Otherwise, this unit may furthermore have a signal transmission function. Various shapes of radio units may be utilized, for instance, an IC card type radio unit and a coin or disk shaped radio unit.

What is claimed is:

1. An information processing system including an information processing apparatus and a portable radio apparatus, wherein said information processing apparatus comprises:

a key input unit having a plurality of data input keys for inputting data, and a plurality of control keys for instructing operations of the information processing apparatus;

an information storage unit which stores information;

a display unit for displaying information;

first input/output terminals for being connected with said portable radio apparatus, for transmitting information to and for receiving information from said portable radio apparatus; and control means for controlling storage of information into said information storage unit, display of information on said display unit, and transmission/ reception of the information via said first input/ output terminals based upon an instruction instructed by said control keys of said key input unit;

and wherein said portable radio apparatus comprises:

a control data storage unit which stores control data for receiving message information transmitted in a radio wave;

a receiver for receiving message information transmitted by a radio wave, based upon control data stored in said control data storage unit;

second input/output terminals for being connected with said first input/output terminals of said information processing apparatus, for transmitting information to and for receiving information from said information processing apparatus;

a storage unit which stores both of message information received by said receiver and information inputted via said second input/output terminals;

a reader which selectively reads message information and inputted information stored in said storage unit; and a display unit for displaying information read out by said reader;

and wherein said control means of said information processing apparatus processes said information stored in the storage unit of said portable radio apparatus based upon the instruction instructed by the control keys of said key input unit, when said second input/ output terminals of said portable radio apparatus are connected with said first input/output terminals of said information processing apparatus.

2. An information processing system as claimed in claim 1, wherein:

said information processing apparatus includes a loading unit on which an external storage medium for storing a program used to cause said control means to process the information stored in said portable radio apparatus, is detachably loaded; and said control means processes the information stored in said portable radio apparatus in accordance with the program stored in said external storage medium in response to operations of said control keys of said key input unit.

3. An information processing system as claimed in claim 2, wherein said program corresponds to a program used to execute at least one of storage, correction, arrangement, edit and display process operations, while the information stored in said portable radio apparatus is fetched into said information processing apparatus.

4. An information processing system as claimed in claim 2, wherein said program corresponds to a program used to store at least one of the input information of said information processing apparatus and the information stored therein into said storage means of said portable ratio apparatus.

5. An information processing system as claimed in claim 4, wherein said input information of said information processing apparatus comprises at least one of telephone directory data and memo data.

6. An information processing system as claimed in claim 4, wherein said information stored in said information processing apparatus comprises at least one of telephone directory data and memo data.

7. An information processing system as claimed in claim 2, wherein:

said external storage medium comprises a memory for storing data; and said portable radio apparatus comprises means for judging whether communication with said information processing apparatus is available or not, and means for transmitting the message information received by said receiver to the memory of said external storage medium so as to be memorized therein, when said judging means judges that the communication is available.

8. An information process system as claimed in claim 2, wherein said external storage medium comprises an IC (integrated circuit) card.

9. An information processing system as claimed in claim 2, wherein:

said external storage medium memorizes data representative of types of the storage medium; and said information processing apparatus displays the type of the storage medium which is loaded on said loading unit.

10. An information processing system as claimed in claim 2, wherein:

said external storage medium comprises a memory for storing data; and said information processing apparatus reads out information from said portable radio apparatus, and transfers the read out information to a memory of said external storage medium so as to be memorized therein.

11. An information processing system as claimed in claim 2, wherein:
said external storage medium comprises a memory for storing data; and
said information processing apparatus transfers the message information received by said receiver of said portable radio apparatus to the memory of said external storage medium so as to be memorized therein.

12. An information processing system as claimed in claim 1, wherein said portable radio apparatus comprises a selector device for selecting data stored in said storage unit to be processed by said information process apparatus.

13. An information processing system as claimed in claim 1, wherein said reader of said portable radio apparatus comprises:
a first selection device for selecting a type of information to be displayed on said display unit; and
a second selection device for successively selecting data of the type of information selected by said first selection device.

14. An information processing system as claimed in claim 1, wherein:
said information processing apparatus comprises an electronic notebook; and
said portable radio apparatus comprises a radio paging unit electrically connectable to said electronic notebook via a cable.

15. An information processing system as claimed in claim 1, wherein said portable radio apparatus comprises an IC card.

16. An information processing system as claimed in claim 1, wherein:
said portable radio apparatus is constructed in an integral form by:
a flat plate portion having a same shape as that of an IC (integrated circuit) card, for containing said second input/output terminals and an electronic circuit portion of said control data storage unit, said receiver, said storage unit and said reader, and
a thick wall portion having a thicker wall than that of the flat plate portion, for containing at least one of said display unit and a battery; and
said information processing apparatus includes a loading unit on which said flat plate portion is inserted and loaded, and in which said first input/output terminal is placed;
whereby said first input/output terminals and second input/output terminals are connected to each other, when the flat plate portion of said portable radio apparatus is inserted and loaded on said loading unit of said information processing apparatus.

17. An information processing system as claimed in claim 1, wherein:
said portable radio apparatus includes a program storage unit for storing a program used to cause said control means to process the information stored in said portable radio apparatus; and
said control means processes the information stored in said portable radio apparatus in accordance with the program stored in the program storage unit of said portable radio apparatus by operating the control keys of said key input unit.

18. An information processing system as claimed in claim 17, wherein said program corresponds to a program used to execute at least one of storage, correction, arrangement, edit and display process operations, while the information stored in said portable radio apparatus is fetched into said information processing apparatus.

19. An information processing system as claimed in claim 17, wherein said program corresponds to a program used to store at least one of the input information of said information processing apparatus and the information stored therein into said storage means of said portable ratio apparatus.

20. An information processing system as claimed in claim 19, wherein said input information of said information processing apparatus comprises at least one of telephone directory data and memo data.

21. An information processing system as claimed in claim 19, wherein said information stored in said information processing apparatus comprises at least one of telephone directory data and memo data.

22. A portable radio apparatus comprising:
a control data storage unit which stores control data for receiving message information transmitted in a radio wave;
a receiver for receiving message information transmitted in a radio wave, based upon control data stored in said control data storage unit;
input/output terminals for being connected with an external device equipped with a data processing function, for transmitting information to and for receiving information from the external device;
a storage unit which stores both of message information received by said receiver and information inputted via said input/output terminals;
a reader which selectively reads message information and inputted information stored in said storage unit; and
a display unit for displaying information read out by the reader.

23. A portable radio apparatus as claimed in claim 22, further comprising:
a program storage unit for storing a process program used to process a storage content of said storage unit by said external device; and
means for outputting the process program stored in said program storage means to said external device.

24. A portable radio apparatus as claimed in claim 23, wherein said process program corresponds to a program used to display the storage content of said storage unit on a display unit of said external device.

25. A portable radio apparatus as claimed in claim 23, wherein said process program corresponds to a program used to correct the information stored in said portable radio apparatus.

26. A portable radio apparatus as claimed in claim 23, wherein said program corresponds to a program used to store the information stored in said portable radio apparatus into an information storage unit of said external device.

27. A portable ratio apparatus as claimed in claim 23, wherein said program corresponds to a program used to store at least one of input information received from said external device and the information stored therein into said storage unit of said portable ratio apparatus.

28. A portable radio apparatus as claimed in claim 27, wherein said input information of said external device comprises at least one of telephone directory data and memo data.

29. A portable radio apparatus as claimed in claim 27, wherein said information stored in said external device comprises at least one of telephone directory data and memo data.

30. A portable radio apparatus as claimed in claim 22, wherein said reader comprises:

a first selection device for selecting a type of information; and a second selection device for successively selecting data of the type of information selected by said first selection device.

31. A portable radio apparatus as claimed in claim 22, wherein:

said storage unit includes a storage area for storing said message information and plural storage areas for storing plural types of said inputted information, respectively; and said reader comprises a first selection device for selecting a type of information, and a second selection device for successively selecting data of the type of information selected by said first selection device.

32. A portable ratio apparatus as claimed in claim 22, wherein:

said portable radio apparatus is constructed in an integral form by:

a flat plate portion having a same shape as that of an IC (integrated circuit) card, for containing said input/output terminals and an electronic circuit portion of said control data storage unit, said receiver, said storage unit and said reader, and a thick wall portion having a thicker wall than that of the flat plate portion, for containing at least one of said display unit and a battery;

whereby said portable radio apparatus is connected to said external device and is able to transmit and receive the information with said external device via said input/output terminals, when the flat plate portion of said portable radio apparatus is inserted and loaded on an IC (integrated circuit) card loading unit of said external device.

33. A portable radio apparatus which is able to detachably load on an IC (integrated circuit) card loading unit of an information processing apparatus, said portable radio apparatus comprising:

a control data storage unit which stores control data for receiving information transmitted in a radio wave;

a receiver for receiving information transmitted in a radio wave, based upon control data stored in said control data storage unit;

a storage unit which stores information received by said receiver and other information to be displayed;

a reader for selectively reading out information stored in said storage unit;

a display unit for displaying information read out by said reader; and connector terminals for being connected with said information processing apparatus to be able to execute a processing of information stored in said storage unit by the information processing apparatus;

wherein said portable radio apparatus is constructed in an integral form by:

a flat plate portion having a same shape as that of an IC card, for containing said connector terminals and an electronic circuit portion of said control data storage unit, said receiver, said storage unit and said reader, and a thick wall portion having a thicker wall than that of the flat plate portion, for containing at least one of said display unit and a battery, wherein said flat plate portion of said portable radio apparatus is inserted and loaded on said IC card loading unit of said information processing apparatus, whereby said portable radio apparatus is connected to connector terminals in said IC card loading unit of said information processing apparatus and a processing of information stored in said storage unit by the information processing apparatus is able to be executed, when the flat plate portion of said portable radio apparatus is inserted and loaded on said IC card loading unit of said information processing apparatus.

* * * * *